US007708023B2

(12) United States Patent
Thomas et al.

(10) Patent No.: US 7,708,023 B2
(45) Date of Patent: *May 4, 2010

(54) SOLID PRODUCT DISPENSER

(75) Inventors: John E. Thomas, River Falls, WI (US); Robert J. Plantikow, Bloomington, MN (US); Thomas P. Berg, Jamestown, NC (US); Thomas Batcher, Mendota Heights, MN (US); Daniel F. Brady, High Point, NC (US); Scott T. Russell, Woodbury, MN (US); Terrence P. Everson, Eagan, MN (US)

(73) Assignee: Ecolab Inc., St. Paul, MN (US)

( * ) Notice: Subject to any disclaimer, the term of this patent is extended or adjusted under 35 U.S.C. 154(b) by 1300 days.

This patent is subject to a terminal disclaimer.

(21) Appl. No.: 11/152,917

(22) Filed: Jun. 15, 2005

(65) Prior Publication Data

US 2006/0083668 A1 Apr. 20, 2006

Related U.S. Application Data

(60) Provisional application No. 60/619,783, filed on Oct. 18, 2004.

(51) Int. Cl.
*B01D 11/02* (2006.01)

(52) U.S. Cl. .......................... 137/14; 137/268; 422/282

(58) Field of Classification Search ................. 137/268, 137/1, 14; 422/261, 264, 266, 278, 282
See application file for complete search history.

(56) References Cited

U.S. PATENT DOCUMENTS

| | | | | |
|---|---|---|---|---|
| 4,826,661 | A | 5/1989 | Copeland et al. | |
| 5,342,587 | A | 8/1994 | Laughlin et al. | |
| 5,478,537 | A | 12/1995 | Laughlin et al. | |
| 5,607,651 | A | 3/1997 | Thomas et al. | |
| 6,645,924 | B2 * | 11/2003 | Klos et al. | 137/268 |
| 6,739,351 | B1 * | 5/2004 | Rosser et al. | 137/268 |

OTHER PUBLICATIONS

"Vernay VernaFlo® Flow Controls," Vernay Laboratories, Inc., 4 pgs., (Date unknown) (© Vernay Laboratories, Inc. Nov. 11, 2003).
"Vernaflo® flow controls," http://vernay.com/products/flowcont.htm, 5 pgs., (Printed Oct. 12, 2004) (© Vernay Laboratories, Inc. 1998).

* cited by examiner

*Primary Examiner*—Kevin L Lee
(74) *Attorney, Agent, or Firm*—Andrew D. Sorensen; Laura C. DiLorenzo

(57) ABSTRACT

A dispenser (10) uses first and second flow controls (70, 73). The flow controls maintain first and second flow ranges independent of diluent pressure within a pressure range, wherein the use solution's concentration is maintained over the pressure range. A third flow control (75) may also be utilized in a third diluent passageway for maintaining a third flow range independent of the diluent pressure within the pressure range. A bypass valve assembly (41) is operatively connected to the third incoming diluent passageway. The bypass valve has a temperature control valve. The temperature control valve having a bypass passageway, wherein additional diluent is added to the use solution, thereby controlling the use solution's concentration.

9 Claims, 12 Drawing Sheets

SOLID PRODUCT DISPENSER

This application claims priority to U.S. Provisional Patent Application No. 60/619,783, filed Oct. 18, 2004.

BACKGROUND OF THE INVENTION

1. Field of the Invention

This invention relates generally to the invention of dispensing a solid product with a diluent, and more particularly to a method and apparatus of controlling the dispensing rate when the diluent changes temperature.

2. Description of the Prior Art

Dispensers that utilize a diluent to erode a product, such as a sanitizer or detergent, are well known. The product being dispensed is typically a solid product and can take the form of either a solid block of chemicals, pellets or a cast product. One example of such a dispenser is found in U.S. Pat. No. 4,826,661 by Copeland et al. This patent discloses a solid block chemical dispenser for cleaning systems. The dispenser includes a spray nozzle for directing a uniform dissolving spray on to a surface of a solid block of cleaning composition. The nozzle sprays on the exposed surface of the solid block, dissolving a portion of the block and forming a use solution. This is just one example of a dispenser that uses a diluent and further just one example of the type of products that may be dispensed. It is recognized that there are many different dispensers which utilize diluents to erode and dispense a portion of a product, which may also have any number of forms.

When dispensing a use solution, it is often important to maintain a certain concentration of the use solution. Prior art dispensers that have done this by controlling the amount of water being sprayed on the solid and added to the use solution have typically used electronics in controlling the valves. Still further, when the additional diluent is added to the use solution, in prior art dispensers, there is often a problem of foaming.

The present invention addresses the problems associated with the prior art dispensers.

SUMMARY OF THE INVENTION

In one embodiment the invention is a dispenser for spraying a diluent onto a solid to create a use solution. The dispenser includes a housing for holding the solid. A spray nozzle is used for impinging a diluent on a solid to form a use solution. The dispenser has a first incoming diluent passageway in fluid communication with the spray nozzle and a first flow control, positioned in the first incoming diluent passageway, for maintaining a first flow range independent of the diluent's pressure within a pressure range. The dispenser also has a second incoming diluent passageway in fluid communication with the use solution and a second flow control, positioned in the second incoming diluent passageway, for maintaining a second flow range independent of the diluent's pressure within the pressure range, wherein the use solution's concentration is maintained over the pressure range.

In another embodiment, the invention is a dispenser for spraying a diluent onto a solid to create a use solution. The dispenser includes a housing for holding the solids and a spray nozzle for use in impinging the diluent on a solid to form the use solution. An incoming diluent passageway is operatively connected to the spray nozzle. A dispenser outlet passageway, having a dispenser outlet, is positioned below the spray nozzle for providing a pathway for the use solution. An additional incoming diluent passageway is provided. A foam control member includes a chamber and an exit conduit, having an opening in fluid communication with the chamber. The exit conduit extending generally downward in the dispenser outlet passageway. The foam control member also includes the additional incoming diluent passageway in fluid communication with the chamber, wherein diluent exits from the exit conduit and mixes with the use solution, when both the use solution and the diluent are moving generally downward.

In another embodiment, the invention is a method of dispensing a use solution by impinging a diluent on a solid. The method includes selecting a nozzle on a flow rate of diluent sufficient to dissolve a solid to provide an amount of dissolved solid. A dynamic flow control is positioned in an incoming diluent passageway, the first dynamic flow control for maintaining a first flow rate independent of the diluent's pressure within a first pressure range. An additional amount of diluent needed to provide a desired concentration of use solution is determined. A second dynamic flow control is positioned in a first supplemental incoming diluent passageway, the second dynamic flow control for maintaining a second flow rate range within a second pressure range, the second flow rate range sufficient to provide the desired concentration of use solution.

DETAILED DESCRIPTION OF A PREFERRED EMBODIMENT

Figure 1:
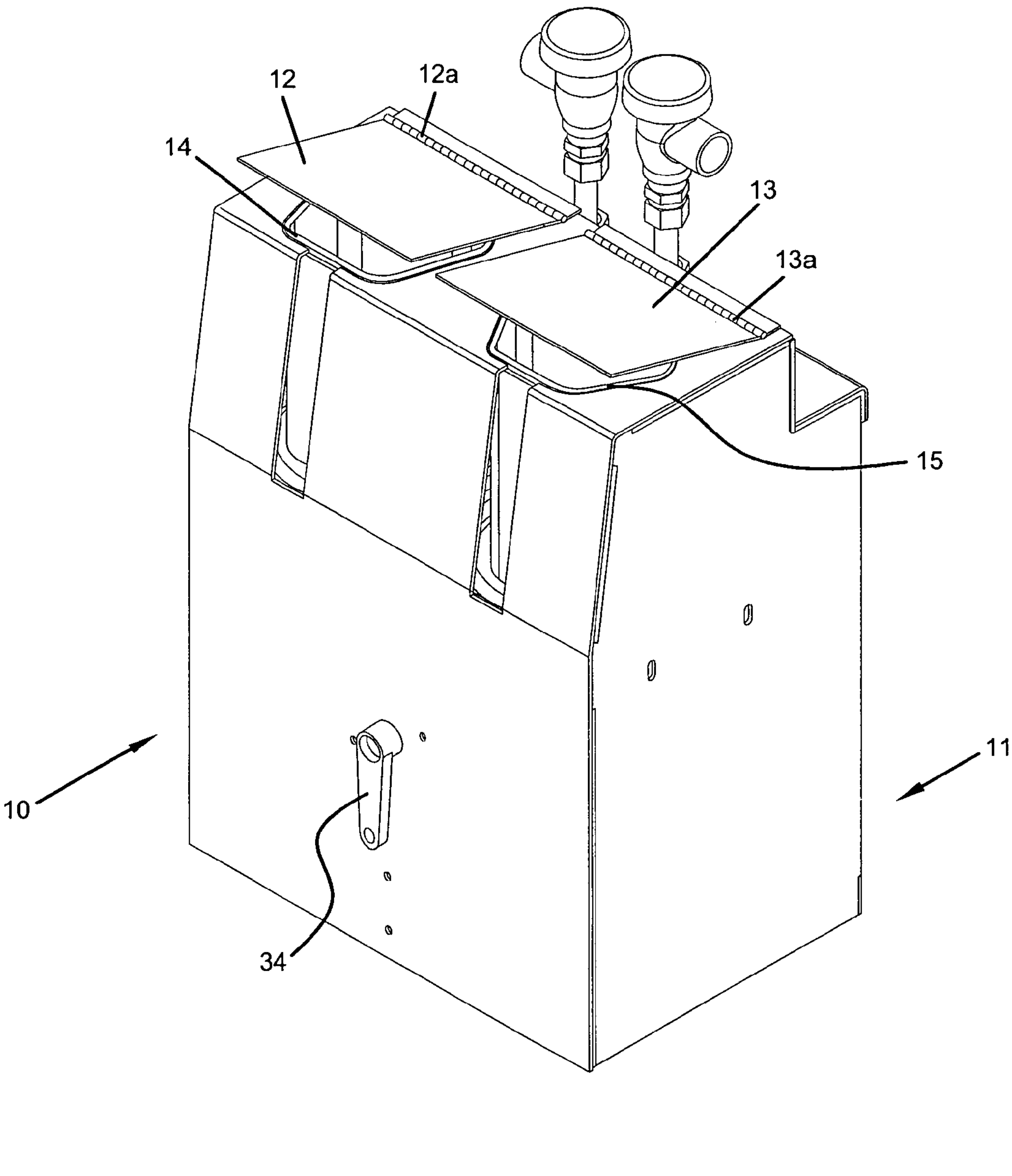
FIG. 1 is a front perspective view of a dispenser according to the present invention.
Figure 2:
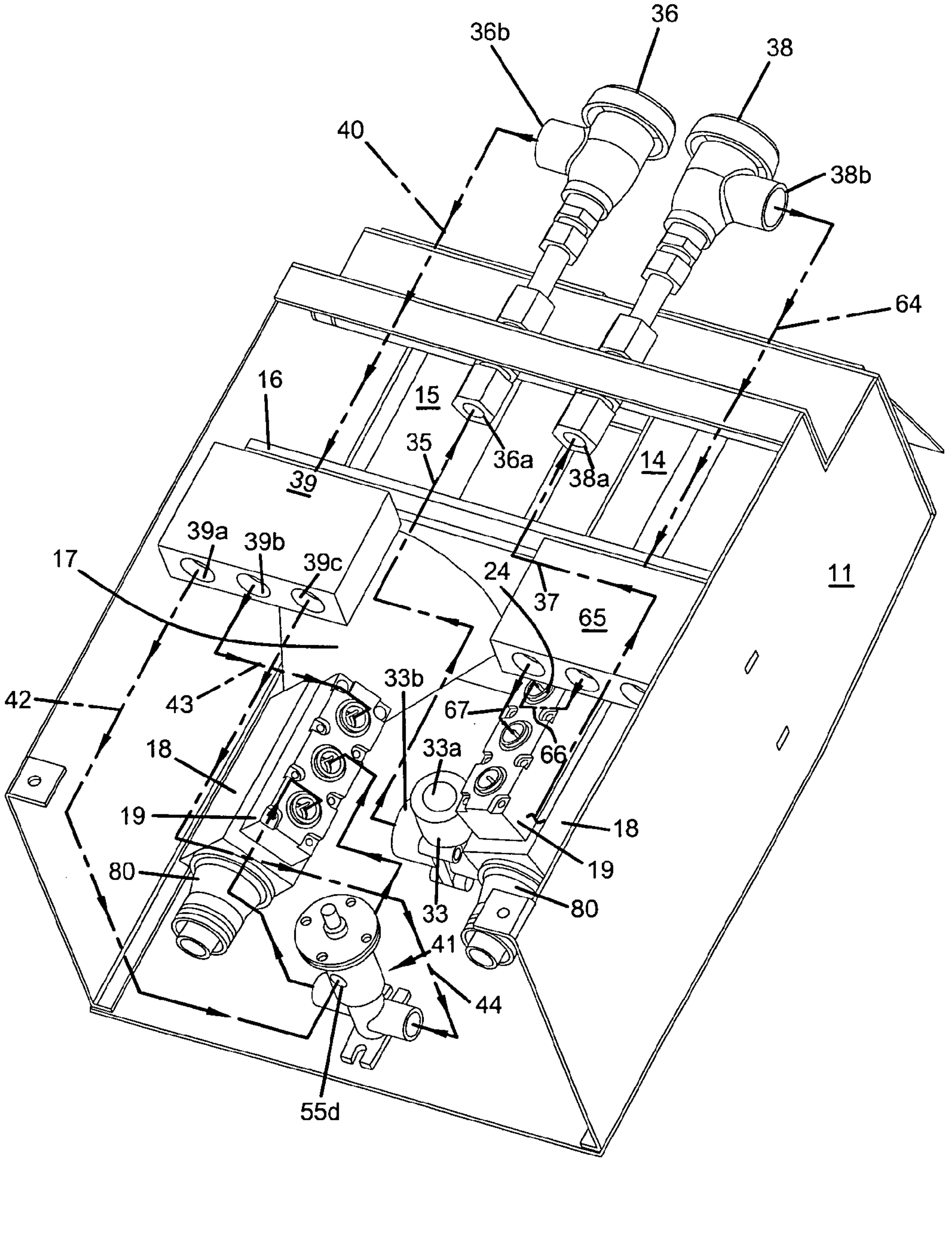
FIG. 2 is a perspective view, shown generally from the rear with the back and bottom removed, of the dispenser shown in FIG. 1.

Referring to the drawing, wherein like numerals represent like parts throughout the several views, there is generally disclosed at 10 a dispenser. The dispenser 10 includes a housing 11. The housing 11 has two lids 12, 13 operatively connected to the housing 11 by suitable means such as a hinges 13, 14*a*. The housing 11 encircles the dispenser 10. However, as shown in FIG. 2, the back and bottom have been removed for clarity. The housing 11 has an inner cavity 1 lain which two product holders 14, 15 are positioned. The product holders 14, 15 are for receiving a suitable solid product such as a detergent, sanitizer or other suitable chemicals from which it is desired to make a use solution. Dispenser 10 is shown as having two product holders 14, 15. However, it is understood that either a single product holder or more product holders may also be incorporated in a dispenser 10 that utilizes the present invention. The dispenser 10 has a screen 16 that extends across the cavity 11*a* and is connected to the sides of the housing 11. The product holders 14, 15 may be supported by the screen 16. The size and mesh opening of the screen 16 are dependent on the chemical to be dispensed and the other factors, well known in the art. Operatively positioned below each product holder 14, 15 is a conical member. The conical member may be placed in the area indicated by 17 in FIG. 2, positioned below the product holder 15. A similar conical member is positioned underneath the product holder 14. The conical member forms a conical cavity. A manifold 18 is operatively connected below the bottom of the conical member by means well known in the art. The conical member sits in the cylindrical opening or bore 18*a* and rests on the shelf 18*b*. The cylindrical opening 18*a* extends down to the bottom of the manifold 18, as viewed in FIG. 6. The end of the opening 18*a* forms the outlet for the use solution. The conical member also acts as a collection member for directing the use solution to cylindrical opening 18*a* of the manifold 18. A block member 19 is suitably attached to the manifold 18 by means well known in the art such as a screw 20. The block member 19 has three bores 19*a*, 19*b*, 19*c* that extend through the block member 19. A passageway 18*c* is formed in the manifold 18 and is in fluid communication with the bore 19*a*. The passageway 18*c* has its other end in fluid communication with a nozzle 21. An O-ring 23 is positioned between the block member 19 and manifold 18 around the bore 19*a* to provide for a liquid tight seal. A fitment 24, having a first member 24*a* operatively connected to a second member 24*b*, is positioned in the bore 19*a*. The fitment 24 is adapted and configured to be connected to a conduit, as will be discussed hereafter. An O-ring 25 is positioned at the end of the fitment 24 inside of the bore 19*a*. A second passageway 18*d* is formed in the manifold 18 and has one end in fluid communication with the bore 19*b* and the other end opening into the cylindrical opening 18*a*. An O-ring 26 is positioned around the passageway 18*d* and the bore 19*b*. A fitment 27, having a first member 27*a* and a second member 27*b*, is positioned in one end of the bore 19*b* and is positioned on an O-ring 28. A third passageway 18*e* is formed in the manifold 18 and is in fluid communication with the bore 19*c*. The second passageway 18*b* opens into the cylindrical opening 18*a*. A fitment 29, having a first member 29*a* and a second member 29*b*, is positioned on an O-ring 30 in the bore 19*c*. An O-ring 31 is positioned between the manifold 18 and block member 19 proximate the bore 19*c* and passageway 18*e*. The third passageway 18*e* opens into the cylindrical opening 18*a*. However, while the passageways 19*d*, 19*e* enter into the cylindrical opening 18*a*, an insert 32 is positioned in the cylindrical opening 18*a*. Three flow controls are utilized in the three passageways formed in the manifold 18 and block 19. A first flow control 70 is positioned in an insert 71 and secured in the first passageway 18*c*. A second flow control 73 is positioned in the second insert 74 and positioned in the second passageway 18*d*. Finally, the third flow control 75 is positioned in the second insert 76 which is positioned in turn in the third passageway 18*e*. An O-ring 72 is positioned behind the fitment 71. The flow controls 70, 73, 75 are flow controls made of a suitable material such as EPM rubber and are flexible and change in shape with respect to changes in pressure in the diluent. The flow controls 70, 73, 75 control flow of the diluent independent of pressure within a reasonable flow range and will have variable orifices 70*a*, 73*a*, 75*a* that change in size dependent on the pressure of the diluent. Any suitable flow controls may be utilized, such as those available from Vernay Laboratories, Inc. The flow controls are referred to as dynamic flow controls. The dynamic flow controls restrict their variable orifices based on pressure, thereby providing a range of flow rates over a range of pressures without the use of electronics to control the flow controls. The specific flow controls that are utilized will be dependent upon the gallon per minute flow rate that is desired. For instance, if a 0.3 gallon per minute flow rate is desired, a suitable part number such as VL3007-111 may be utilized. Other flow controls would be used if different flow rates are required. As one example, flow control 70 may be a 0.3 gallon per minute flow control, flow control 73 and 2.0 gallon per minute flow control and the third flow control 75 a 3.5 gallon per minute flow control. This will be discussed more fully hereinafter.

Figure 6:
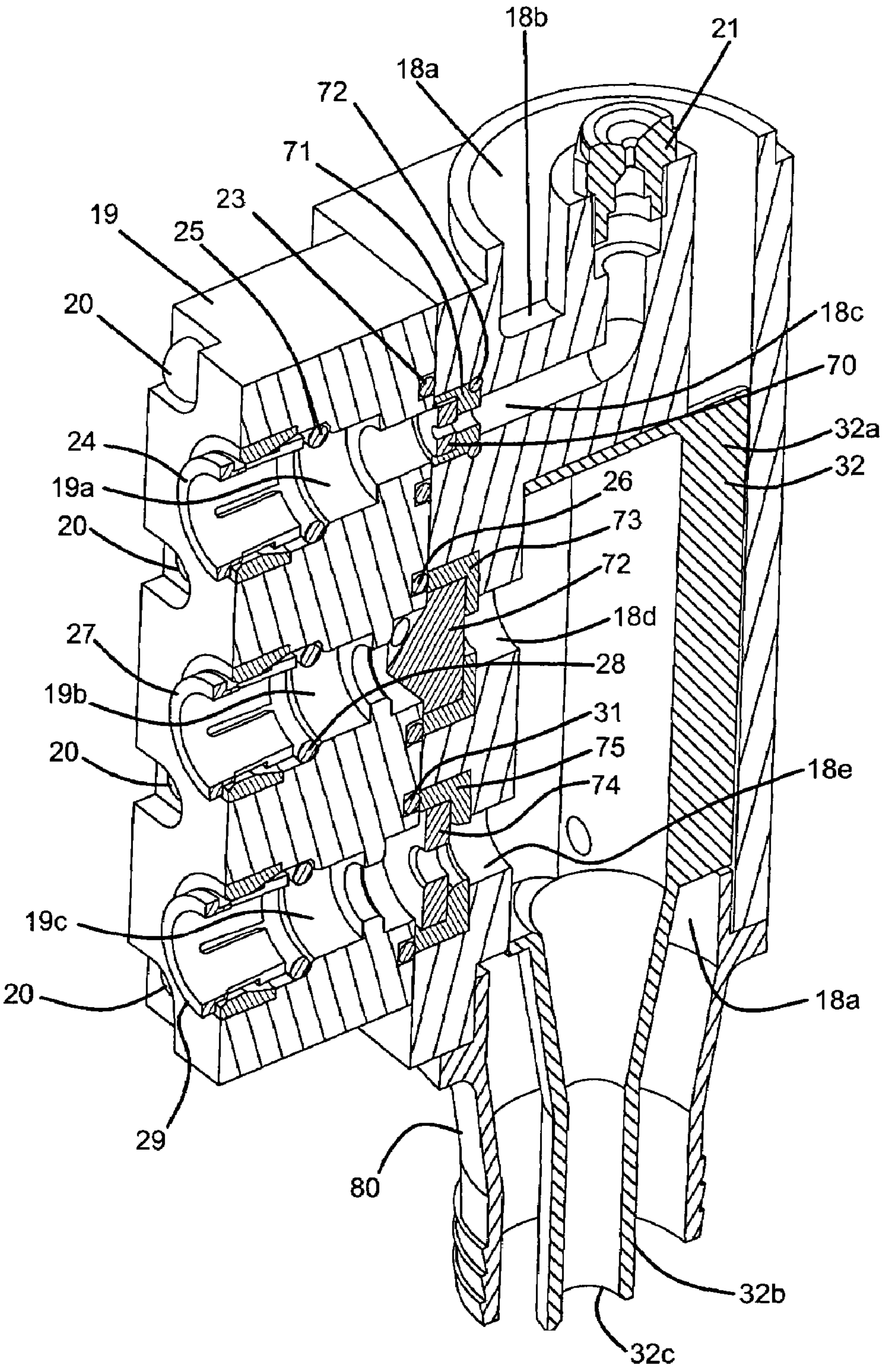
FIG. 6 is an enlarged perspective view, with portions broken away of a portion of the dispenser shown in FIG. 2.
Figure 7:
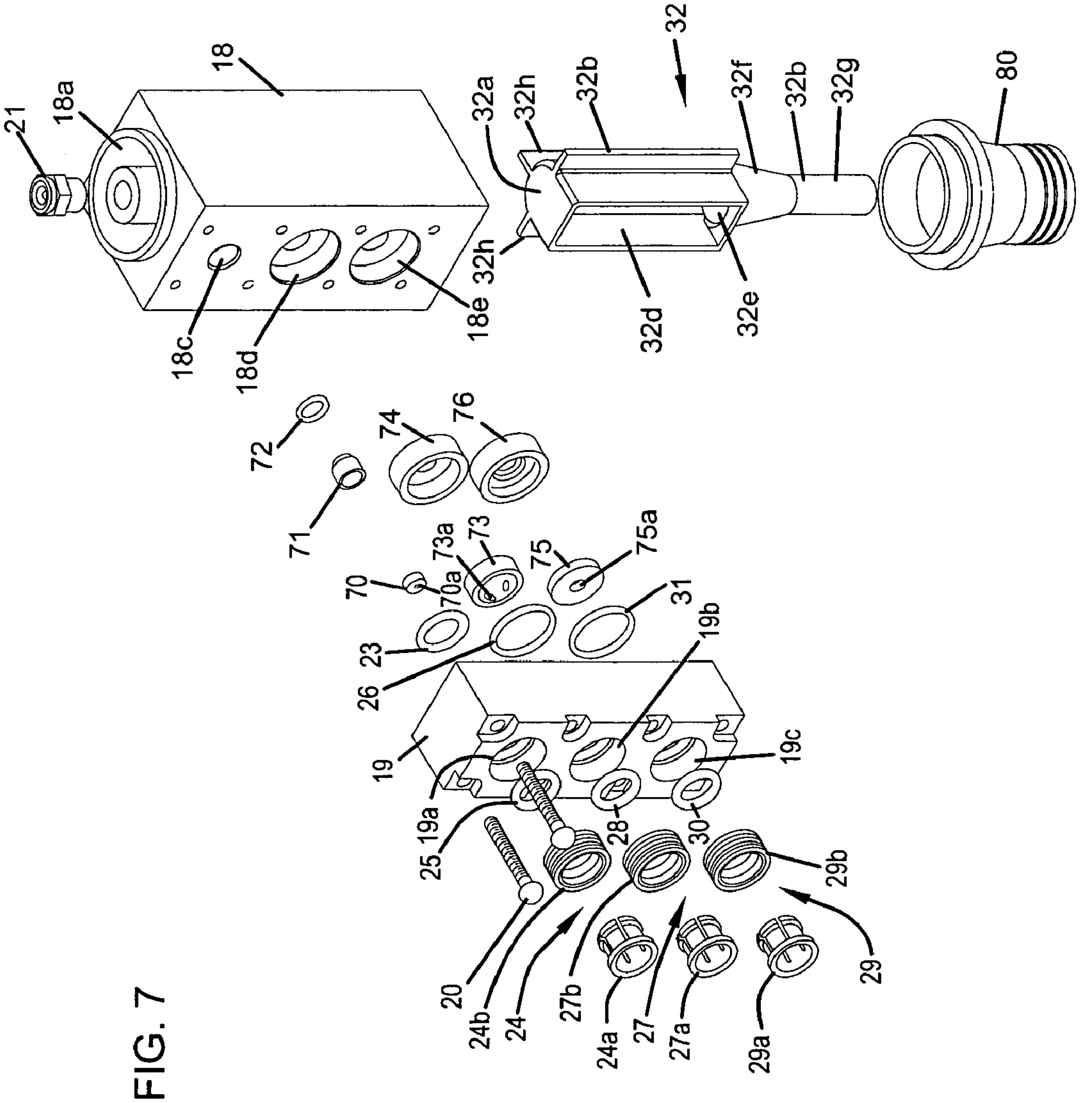
FIG. 7 is an exploded perspective view of the manifold shown in FIG. 6.

The insert 32, as shown in FIGS. 6 and 7, has a first section 32*a* and a second section 32*b*. The second section 32*b* has an exit opening 32*c* at its end.

Figure 8:
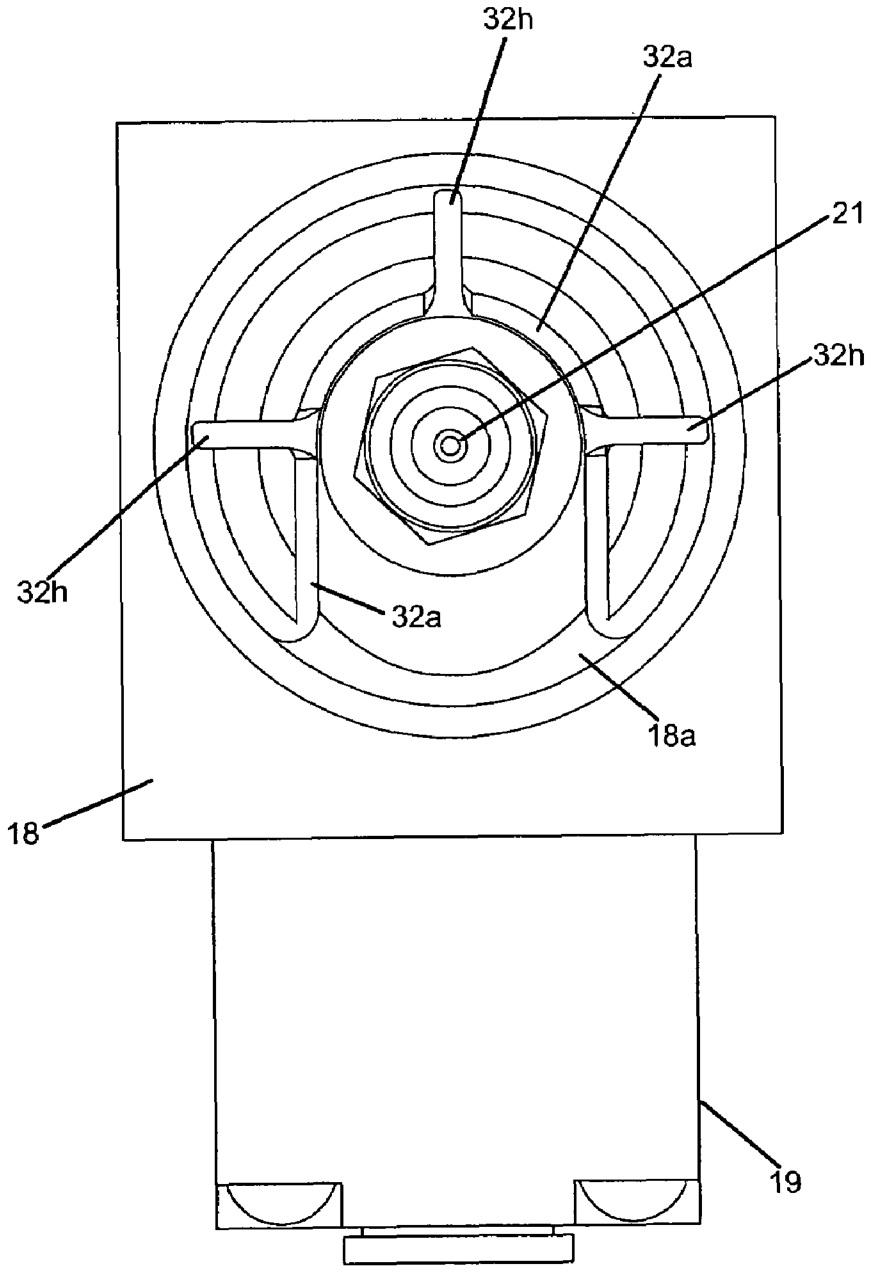
FIG. 8 is a bottom plan view of the assembled manifold shown in FIG. 7.

The insert 32 is a water dampener and reduces turbulents that contributes to foam generation. The first section 32*a* forms a housing that receives the diluent from passageways 18*d*, 18*e*. The passageways 18*d* and 18*e* may enter from the side, as shown in the figures, or from other directions, such as from the top. The first section 32*a* has a rectangular opening that is sized and configured to fit around the passageways 18*d*, 18*e* when the insert 32 is placed inside of the bore 18*a*. The passageway around the insert 32 is defined by the area between the fins and the wall of the cylindrical opening 18*a*. In this manner, the insert does not block the flow of the use solution. The cylindrical opening 18*a* provides for the dispenser outlet passageway and has a dispenser outlet at its end, wherein a suitable conduit (not shown) will take the use solution and deliver it to an appropriate end use. The first section 32*a* is enclosed and therefore the diluent from passageways 18*d*, 18*e* enter into the first section 32*a* through the rectangular opening 32*d* and exits through an opening 32*e* that is in fluid communication with the second section 32*b*. The second section 32*b* includes a first conical section 32*f* operatively connected to a tubular section 32*g* which is an exit conduit. Three fins 32*h* extend radially outward from the first section 32*a*. The fins 32*h* form a friction fit with the bore 18*a* and hold the insert 32 in position. The fins provide for a passageway for the use solution that enters the top of the cylindrical opening 18*a*. The use solution is able to go around the outside of the insert 32. Referring to FIG. 8, the top portion of the insert 32 has been removed for clarity when preparing this Figure, so that the nozzle 21 is visible.

Figure 3:
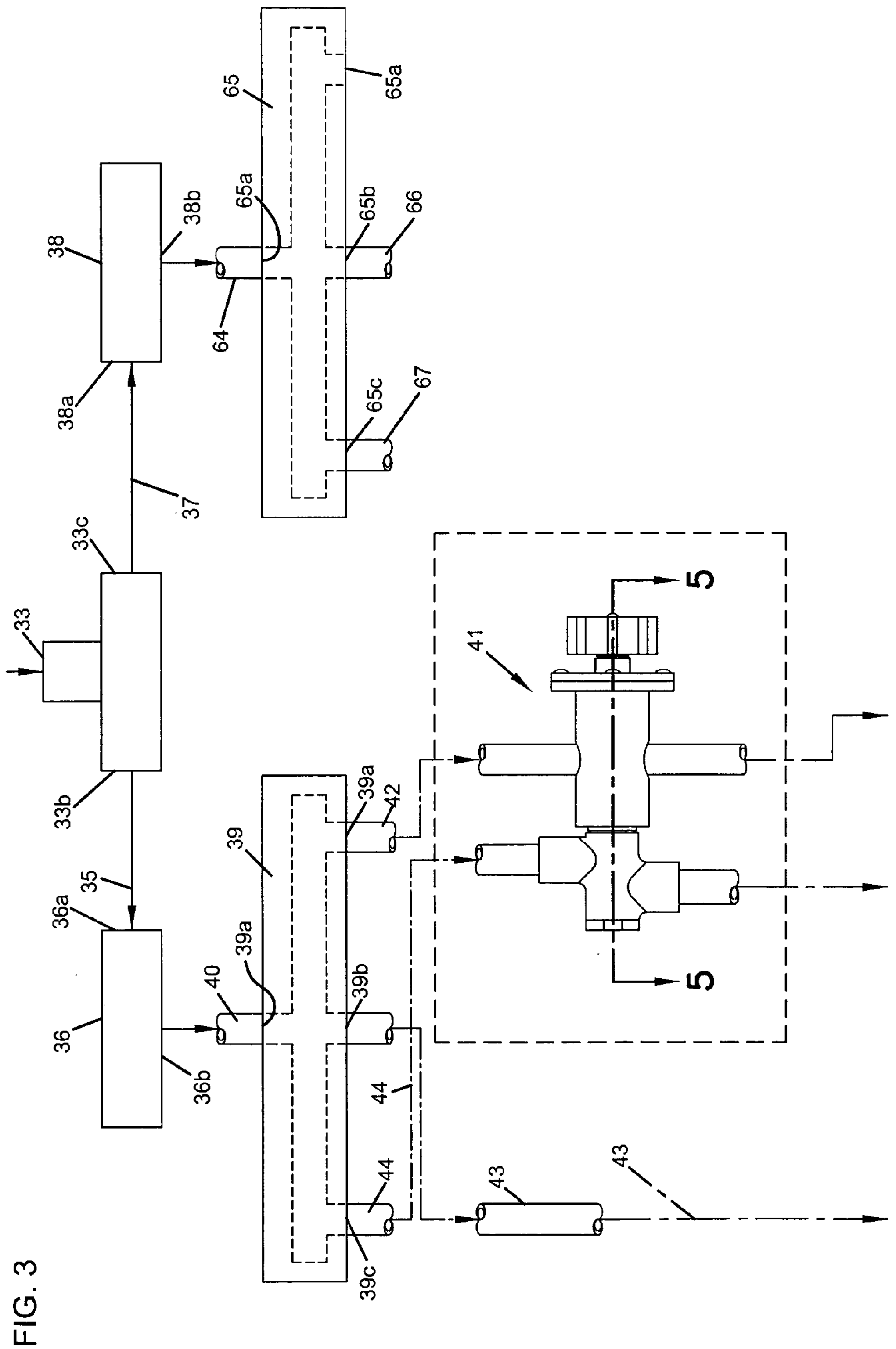
FIG. 3 is an enlarged view of one embodiment of the present invention that is utilized with the dispenser shown in FIG. 1.
Figure 4:
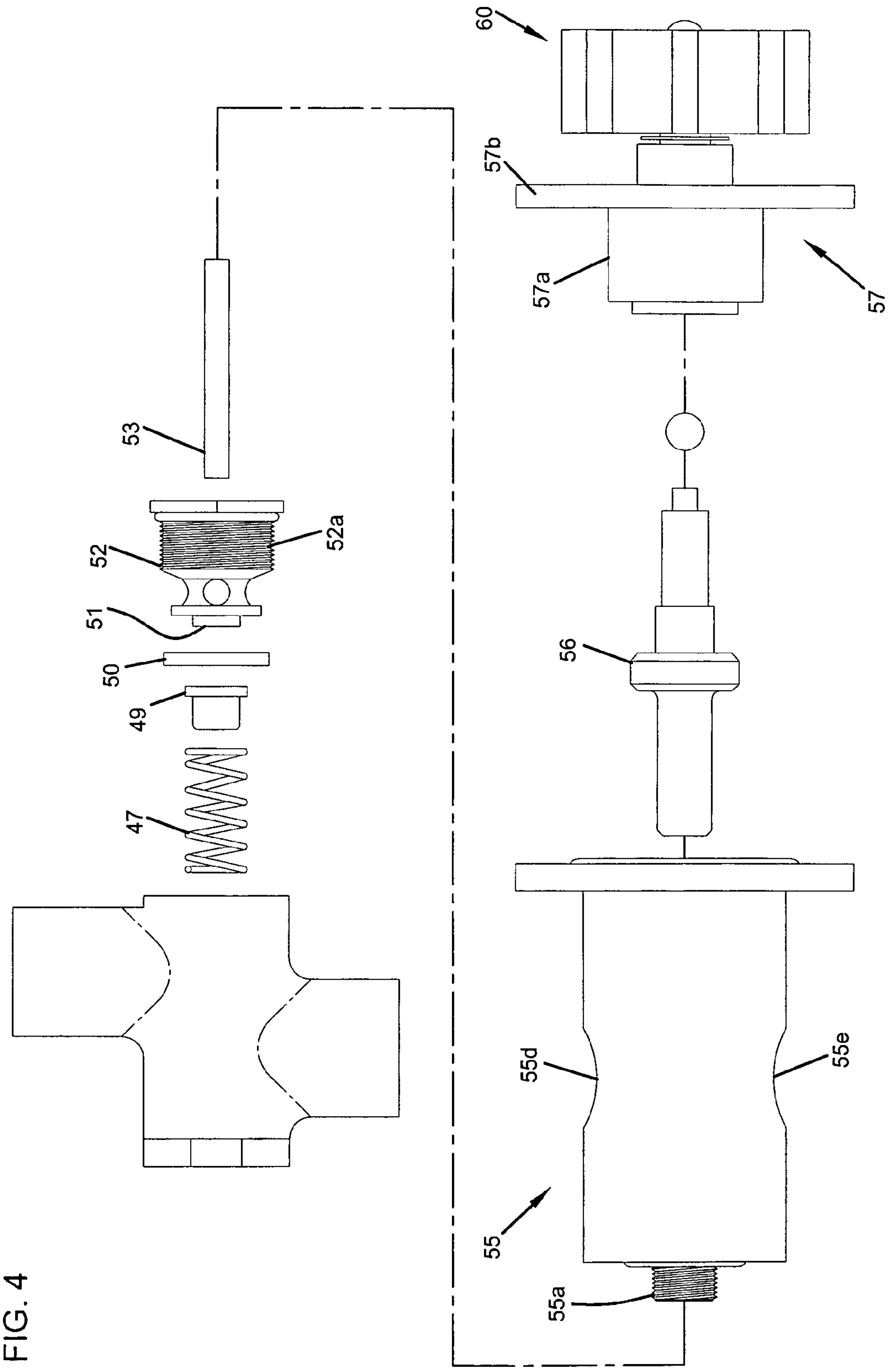
FIG. 4 is an exploded front elevational view of a portion of the invention shown in FIG. 3.
Figure 5:
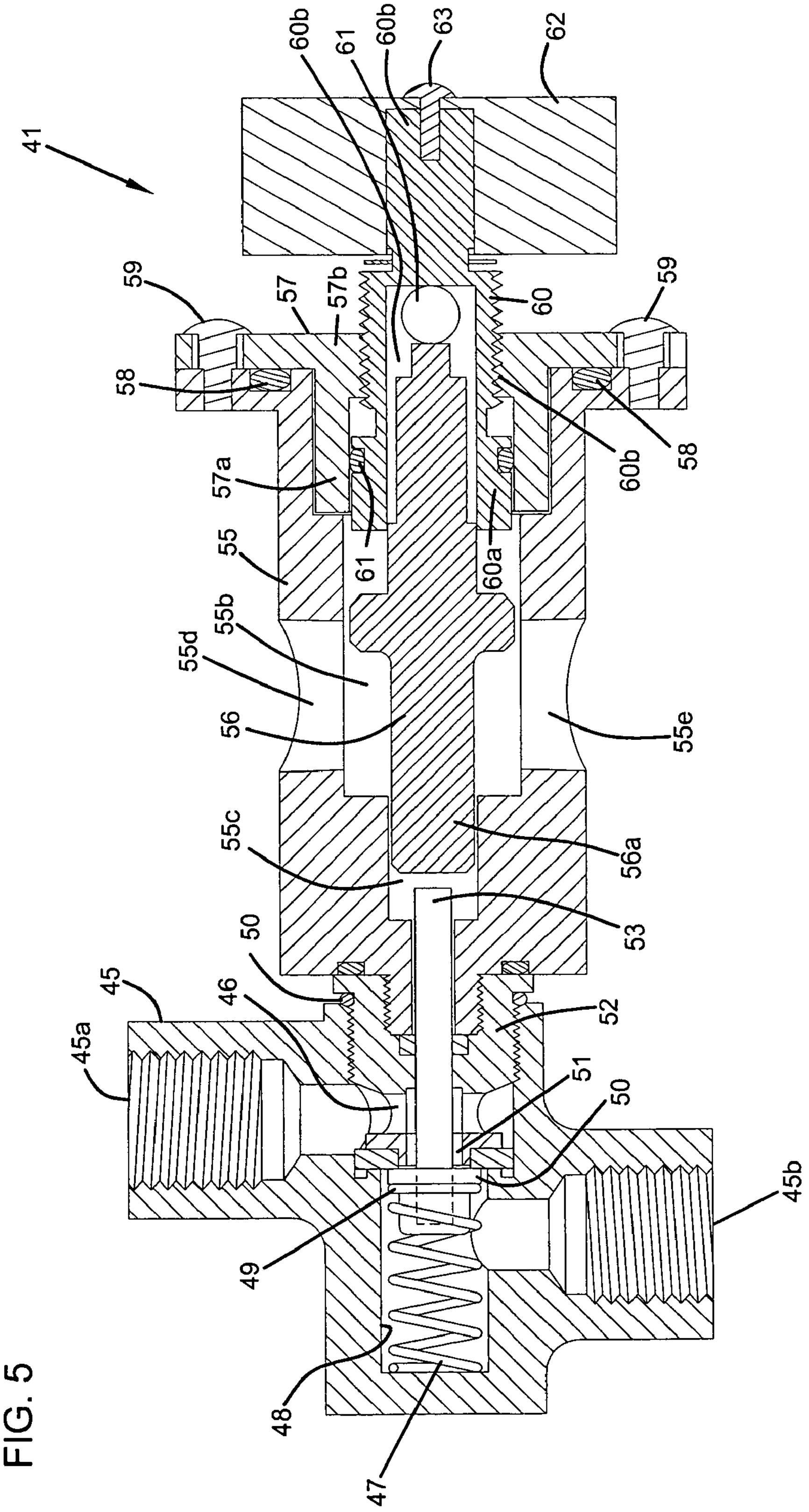
FIG. 5 is a cross sectional view of a portion of Section 3, taken generally along the lines 5-5.

The dispenser 10 has a main diluent inlet 33 that has an opening 33*a* that is adapted and configured to receive an inlet line (not shown) that carries the diluent, typically water. A handle 34 is used as a shut-off valve to open and close the inlet opening 33*a*. The main inlet 33 has two exits 33*b*, only one of which is shown in FIG. 2. A schematic of the flow is shown in FIG. 3. However, in the figures, for clarity, the conduit or tubing has been replaced with lines having arrows. In FIG. 3, sections of the tubing or conduit is shown as illustrative of what the conduit may look like. However, the insertion of the conduit into FIG. 2 would obscure several parts from view and accordingly has been replaced by the lines with arrows. The exit 33*b* that is shown is in fluid communication, by suitable means such as a conduit 35 to and inlet 36*a* of a vacuum breaker 36. The other exit of the inlet 33*c* is in fluid communication by suitable means such as a conduit 37 to an inlet 38*a* of a second vacuum breaker 38. The first vacuum breaker 36 has an outlet 36*b* that is in fluid communication with a manifold 39 by suitable means such as a conduit 40. It is understood that the manifold 39 may take on any number of different forms, well known in the art. The manifold 39 is for taking a single flow of diluent and dividing it into two or more streams of diluent. The entrance opening 39*a* of the manifold 39 is in fluid communication with three outlets 39*a*, 39*b*, 39*c*. Outlet 39*a* is in fluid communication with a thermal valve 41 as will be described more fully hereafter. The outlet 39*a* is in fluid communication by suitable means such as a conduit 42. Outlet 39*b* is in fluid communication with bore 19*a* by suitable means such as a conduit 43 and outlet 39*c* is in fluid communication with the thermal valve 41 by suitable means such as a conduit 44. Referring now, especially to FIGS. 4 and 5, there is shown a thermal valve assembly 41. The thermal valve assembly 41 includes a typical valve 45 that has an inlet 45*a* and an outlet 45*b*. A passageway 46 places the inlet 45*a* in fluid communication with the outlet 45*b*. A spring 47 is positioned inside of bore 48. The spring 47 has one end against the valve 45 and another end against a cap 49. A rubber gasket 50 has a central opening and is positioned around the exit 51 of the spool 52. A rod 53 is positioned through the spool 52 and goes into the cap 49. A viewed in FIGS. 4 and 5, movement to the left by the rod 53 will cause the cap 49 to move off of the exit 51 and allowing water to pass from the inlet 45*a* to the outlet 45*b*. It is understood that any suitable valve 45 may be utilized with the thermal valve assembly 41. The spool 52 is operatively connected to the valve 45 by screw threads 52*a* and has an O-ring 54 positioned between the valve 45 and the spool 52. A cylindrical housing 55 has a first end 55*a* that is threaded and is adapted and configured to be operatively connected to the valve 45 by threading on to mating grooves in the spool 52. The end 55 has an aperture through which the rod 53 is positioned. The cylindrical housing 55 has a cavity 55*b* in which a thermal motor 56 is positioned. The cavity 55*a* has a distal end 55*c* that is sized and configured to support a first end 56*a* of the thermal motor 56. The cylindrical housing has an inlet opening 55*d* and an outlet opening 55*e* to allow water to pass therethrough. The thermal motor 56 may be any suitable thermal sensitive member that expands or changes in length as its temperature changes. One suitable example is Model No. MMV by Watts Regulator Company, Laurence, Mass. The cap 57 includes a generally cylindrical member 57*a* operatively connected to a disc member 57*b*. The cylindrical member 57*a* is sized and configured to fit inside of the cavity 55*a*. An O-ring 58 is positioned between the cylindrical housing 55 and the cap 57 to provide a water-tight seal. The cap 57 is secured to the housing 55 by suitable means such as screws 59. An adjustment element 60 is operatively connected to the cap 57. The element 60 has a cylindrical body that is adapted and configured to fit inside of the cylindrical member 57*a* of the cap 57. The adjustment element 60 has a cylindrical element 60*a* that has a threaded section 60*b* that matches with corresponding grooves formed in the cap 57. The cylindrical member 60*a* is sealed against the cap 57 by an O-ring 61. As can be seen in FIG. 5, the cylindrical member 60*a* is sized and configured to receive the thermal motor 56. A ball bearing or similar device 61 is positioned in the inner cavity 60*b* of the cylindrical member 60*a*. The adjustment element 60 has an end 60*b* that is secured to a knob 62 by suitable means such as a screw 63. It can therefore be seen that as a knob 62 is rotated, the adjustment element 60 will move in and out of the cap 57 thereby moving the thermal motor 56 closer to or further away from the end of the rod 53 and thereby changing the temperature at which the rod 53 will open the valve 45. It is also understood that another way of adjusting the valve assembly 41 is to change the length of rod 53.

An adapter 80 is secured to the bottom of the manifold 18. The adapter 80 has a central bore that is in alignment with the cylindrical opening 18*a* and provides for a mechanism to collect the use solution and guide it into a suitable conduit (not shown) that is connected on the end of the adapter 80. The conduit that would be connected to the adapter 80 would remove not only the use solution, but also the diluent exiting the insert 32.

The product in the holder 14 does not utilize a thermal valve assembly and therefore has a slightly different construction with respect to the flow of the diluent or water. The water flows from the outlet 38*b* of the second vacuum breaker 38 to a manifold 65. The manifold 65 is similar in construction to the manifold 39. The manifold 65 is in fluid communication with the outlet 38*b* of the second vacuum breaker by suitable means such as a conduit 64. The manifold 65 has an inlet 65*a* that is in fluid communication with three outlets 65*a*, 65*b*, 65*c*. However, since a thermal valve assembly is not utilized, only two outlet ports of the manifold 65 are utilized. The third outlet port 65*c* is plugged, with a suitable plug (not shown). Similarly, a manifold 18 and block 19 are utilized, but the third passageway 18*e* is not utilized. The outlet 65*b* is in fluid communication by a suitable conduit 66 with the fitment 34 of block 19. The outlet 65*c* is in fluid communication with a suitable conduit 67 with fitment 27. Again, suitable flow controls 70, 73 are utilized in the block 18 used with the dispenser associated with the second product holder 15.

In operation, the dispenser 10 delivers use solutions from solids through the use of flow controls for the diluent. The diluent is split into either two or three streams depending on whether or not the product being dispensed is temperature sensitive for erosion. When the use solution is desired, the handle 34 is rotated thereby allowing diluent to pass through the main inlet 33. It is understood that the present invention can be utilized with one or more different products, two of which are shown in the drawings. Further, it is understood that the present invention may be utilized with or without the temperature control feature of the thermal valve assembly 41. The product being dispensed from holder 15 will be described with respect to use of the thermal valve 41 and the product to be dispensed from product holder 14 will be described with respect to not using the thermal valve 41.

The water flowing into the main inlet 33 will be diverted to both the first vacuum breaker 36 and second vacuum breaker 38, although it is understood that only one may be utilized with the present invention. From the first vacuum breaker 36, the water passes to the first manifold 39*a* through the inlet 39*a* and exits the three outlets 39*a*, 39*b*, 39*c*. The water exiting outlet 39*b* passes through the second manifold through bore 19*a* and passageway 18*c*. There, the water will exit the nozzle 21 and form an appropriate spray pattern and erode the product (not shown) held in the product holder 15 and a use solution will be formed. The use solution will fall down into the conical member 17 and enter the cylindrical opening 18*a* in the manifold 18. The use solution will pass around the insert 32 in the channels created by the fins and exit the outlet of the cylindrical opening 18*a* between the adapter 80 and the second section 32*b* of the insert 32. The diluent exiting outlet 39*a* will enter the thermal valve 41 and pass through the opening 55*d* and out of the opening 55*e* into the bore 19*b*. It will then exit the second passageway 18*d* and empty into the first section 32*a* of the insert 32. The diluent exiting the outlet 39*c* will pass, via conduit 44, to the inlet 45*a* of the valve 45. However, if the temperature of the diluent is below a predetermined value, the valve 45 will be closed. The predetermined value will change dependent on the product and concentration needed. If the diluent or water increases in temperature, the thermal motor 56 is exposed to the diluent as it is passing through the openings 55*d*, 55*e*. As the temperature increases, the thermal motor 56 expands in size and opens the valve 45, thereby allowing more water to enter into the first section 32*a* of the insert 32 through the bore 19*c* and third passageway 18*e*. This additional diluent reduces the concentration of the use solution that would increase as the temperature increases.

Flow through all of the passageways 18*d*, 18*e*, 18*f* is controlled by the flow controls 70, 73, 75. The flow controls 70, 73, 75 are seated dynamic flow control devices that control the flow of the water, as will be described more fully hereafter, to provide for a controlled reasonable flow range of the diluent.

The diluent that enters the insert 32 does not mix immediately with the use solution. The use solution, as it is passing outside the insert 32, is generally in a downward direction. Similarly, the diluent in the insert 32 will be redirected so that it is not at an angle to the use solution, but will again be flowing generally downward and parallel to the use solution. Therefore, when the use solution mixes with the diluent from the insert 32, the diluent and use solution are moving generally in the same direction, thereby minimizing shear forces and thereby reducing foam.

The product to be dispensed from product holder 14 does not erode at substantially different rates, dependent upon the temperature of the diluent. Accordingly, it is not necessary that a thermal valve 41 is utilized. Instead, only flow through the first passageway 18*c* and second passageway 18*d* are utilized and is the same as described with respect to the product dispensed from product holder 15 and will not be reiterated. The flow control members 70, 73 are utilized to again control the volume of diluent as will be described more fully hereafter. Again, the diluent through the second passageway 18*d* enters the insert 32 to reduce foaming.

Figure 9:
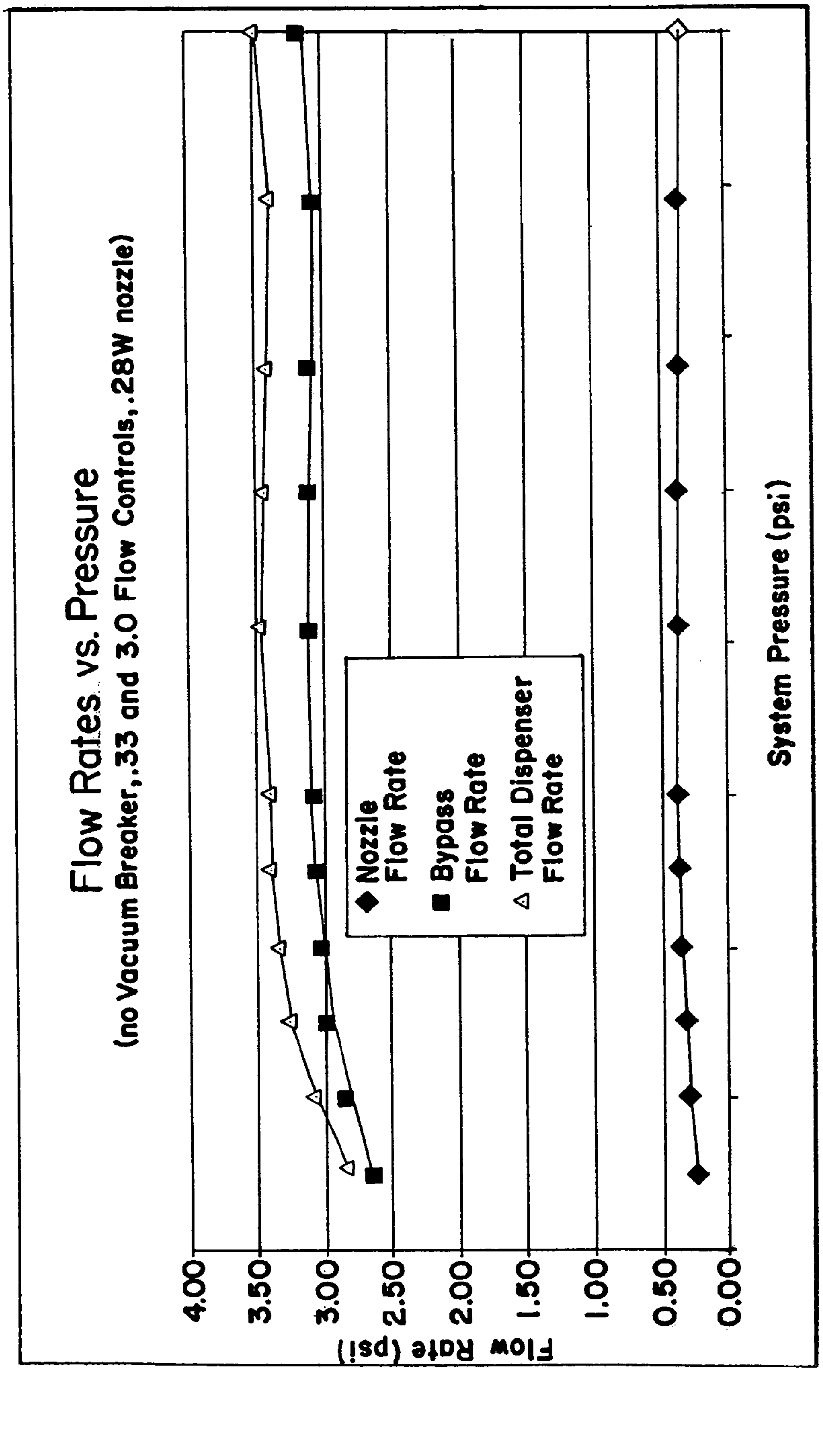
FIG. 9 is a chart showing flow rates verses pressure for various flow controls used in the invention.

The present invention is able to provide a dispenser that is able to provide a use solution at a desired concentration without the use of electronics or controls. The use of the dynamic flow control in the passageway provides for flow, within a range, independent of pressure within the system over a reasonable flow range such as from 30-100 psi. FIG. 9 is a chart of the range of the flow rate in gallons per minute verses pressure in pounds per square inch of a dispenser that utilizes a 0.33 gallon per minute flow control and a 3.0 gallon per minute flow control with a 0.28 nozzle. The bottom line shows that the dispensing rate of the 0.33 flow control is relatively constant over the measured range of from 15 to 90 psi. Similarly, the flow rate of the 3.0 gallon per minute flow control is relatively constant between the pressures of 15 and 90, and especially more consistent within the range of 30 to 90 psi. At the rate of 30 psi for both flow controls, the flow rate is at or above the desired rate. Applicant has also found that this relationship extends to 100 psi, even though not shown in the chart.

Figure 10:
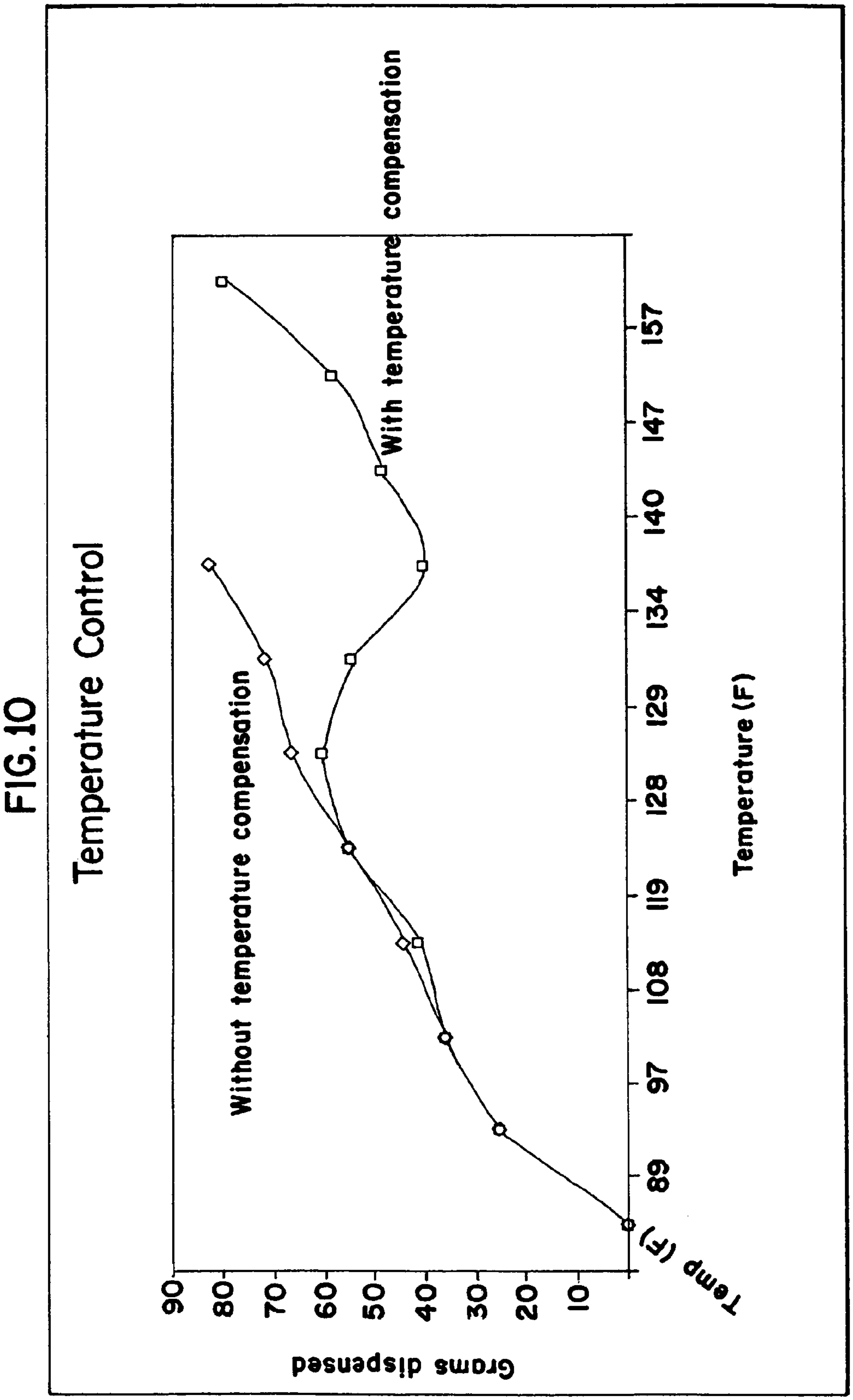
FIG. 10 is a chart showing grams dispensed for a 20-gallon fill utilizing the thermal valve of the present invention.

FIG. 10 is a chart showing use of the present invention for dispensing quaternary salt from a detergent having 40 percent quaternary salt. The chart is representative of a 20-gallon fill. As can be seen, the line for "without temperature compensation" indicates a dispenser that does not have the thermal valve of the present invention, wherein the lower line utilizes the thermal valve of the present invention. As shown in FIG. 10, the thermal valve assembly 41 is set to open at 120 degrees. Therefore, since the thermal valve would open at 120 degrees, additional water would be dispensed, thereby decreasing the time to dispense 20 gallons and thereby deleting the total number of grams of product dispensed for a 20-gallon fill.

Figure 11:
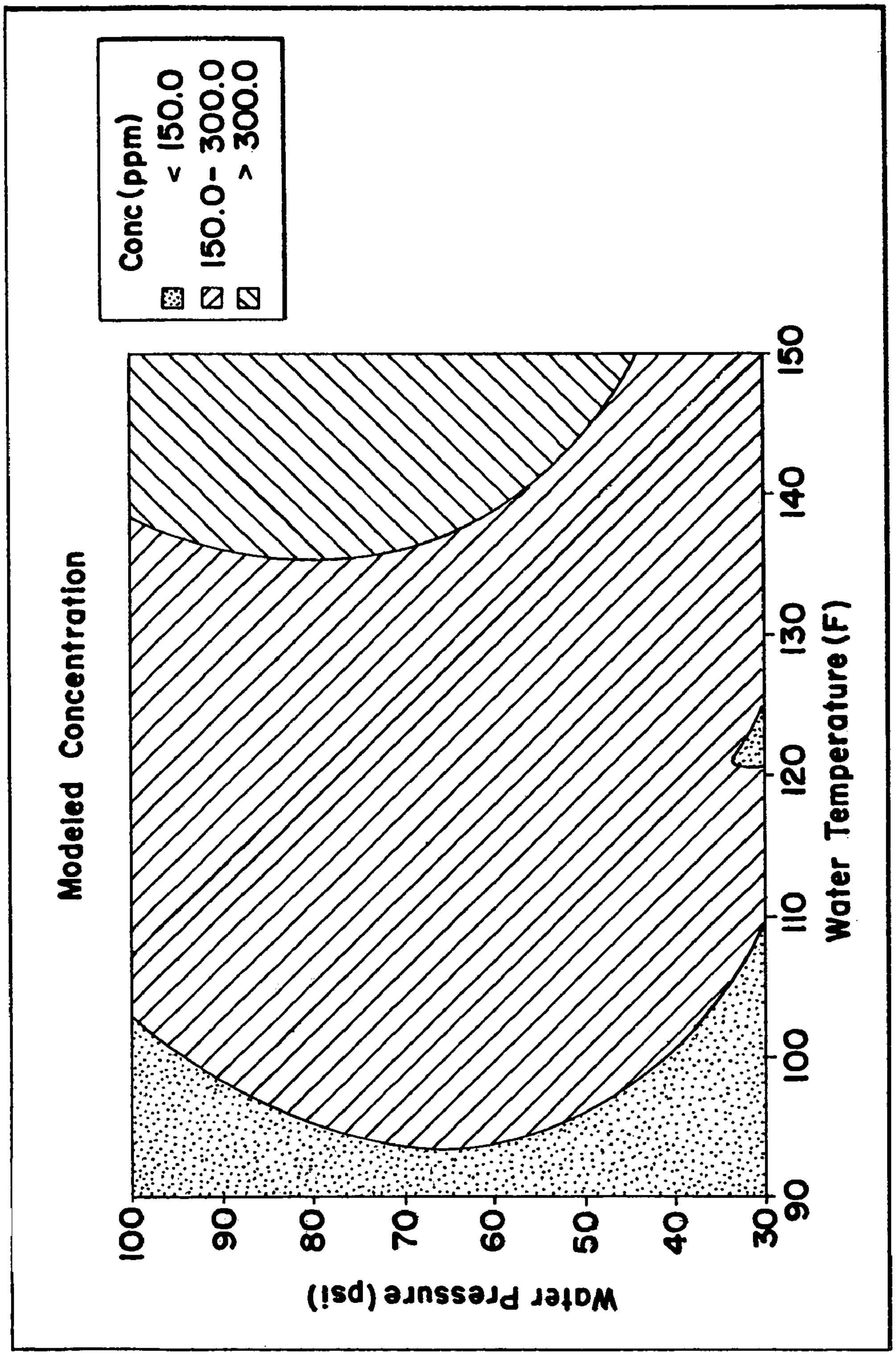
FIG. 11 is a chart showing the concentration of the use solution under various conditions.
Figure 12:
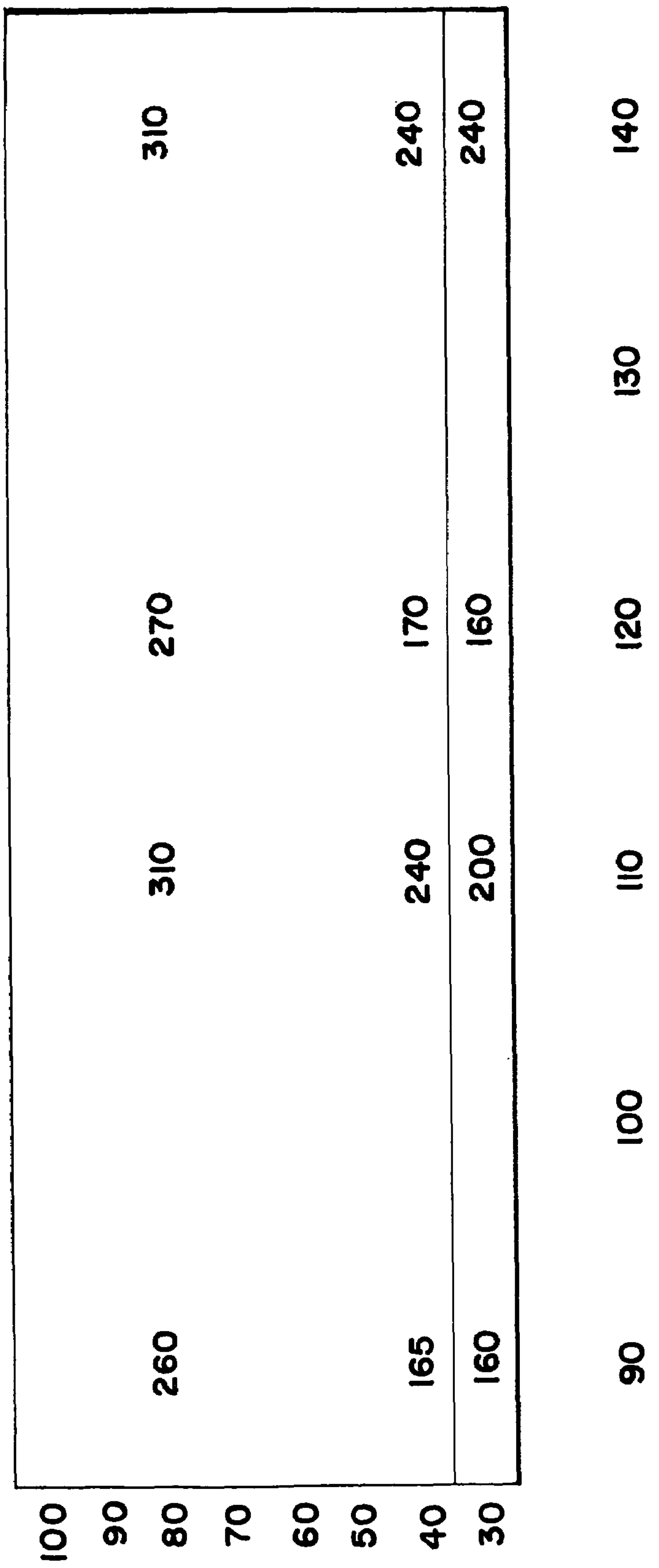
FIG. 12 is a chart showing concentrations of a use solution utilizing different parameters than the chart in FIG. 11.

Referring now to FIGS. 11 and 12, it can be seen how the present invention is able to keep the concentration of the use solution within a specified range for a range of temperatures and water pressures. FIG. 11 utilizes a dispenser that has a flow control 70 of 0.33 gallons per minute, a flow control 73 of 3.5 gallons per minute and a flow control 75 of 2.0 gallons per minute. The nozzle 21 is rated at 0.28 gallons per minute. This is also for a quaternary salt where a desired concentration is between 150-300 parts per million. The thermal valve 41 is set to open at 120 degrees. It can be seen that there are certain areas that are not in the desired range of 150-300 parts per million as represented by the lightest shade and the darkest shade. With the present invention, it is then able to be adjusted by simply changing one or more of the variables. For instance, it would be possible to increase the flow rate through the thermal bypass 41, thereby bringing down the concentration at the higher temperatures. Alternately, the amount of product being dissolved may be controlled by reducing the flow through the nozzle 21. FIG. 12 represents a dispenser, similar to FIG. 11, expect flow control 70 was lowered to a 0.3 gallons per minute. Then, the parts per million reading are represented by the numbers in the chart. It can be seen that all of the numbers are within the desired range of 150-300 parts per million throughout the range of 30-100 psi and a temperature range of from 90-140 degrees. It is recognized that two of the readings are at 310, slightly out of the desired range. However, this is well within experimental error in testing. One additional change with respect to FIG. 12 is that the thermal bypass was set to be activated at 117 degrees rather 120 degrees.

It can therefore be seen that the present invention is very useful in designing a dispenser that utilizes dynamic flow controls that does not rely on electronics to provide for a desired concentration of a use solution. While the examples described so far have been with respect to a quaternary salt, it is understood that other formulations such as all-purpose cleaners, acid floor cleaners, alkaline floor cleaners and third sink sanitizers as well as other formulas may be utilized. In dispensing the desired concentration from a product, it is understood that it would be dependent upon the product being dispensed and the nozzle. Accordingly, a nozzle 21 is selected that provides for an appropriate spray on the area of the product being dispensed. The spray pattern should typically cover the entire block. The flow control 70 for the nozzle 21 is typically sized slightly larger then that of the capacity of the nozzle. For instance, if a 0.28 flow rate nozzle is desired, a 0.30 or 0.33 flow control is provided. The nozzles are typically rated at the flow rate at 10 psi. Typically, the pressure will effect the force on which the water is impinged on the product and the flow rate will determine the amount of product dissolved. One can easily measure the amount of product that is dissolved over a targeted time. Then, it is simply necessary to supply an additional amount of diluent through the flow control 73 to provide the desired concentration. Alternately, if the product being dispensed is temperature sensitive with respect to the diluent, the thermal valve 41 may be utilized and flow is provided through the flow control 75.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A dispenser for spraying a diluent onto a solid to create a use solution, the dispenser comprising:

a housing for holding the solid;

a spray nozzle for use in impinging a diluent on a solid to form a use solution;

a first incoming diluent passageway in fluid communication with the spray nozzle;

a first flow control, positioned in the first incoming diluent passageway, for maintaining a first flow range independent of the diluent's pressure within a pressure range;

a second incoming diluent passageway in fluid communication with the use solution;

a second flow control, positioned in the second incoming diluent passageway, for maintaining a second flow range independent of the diluent's pressure within the pressure range;

a third incoming diluent passageway in fluid communication with the use solution;

a third flow control, positioned in the third diluent passageway, for maintaining a third flow range independent of the diluent pressure within the pressure range; and a bypass valve operatively connected to the third incoming diluent passageway, the bypass valve having a temperature control valve, the temperature control valve having a bypass passageway, the bypass passageway operatively connecting the third incoming diluent passageway to a dispenser outlet.

2. The dispenser of claim 1, further comprising the flow controls constructed from an elastomeric product and are dynamic flow controls.

3. The dispenser of claim 2, further comprising the flow controls having a variable orifice that changes in size in response to pressure changes wherein the flow ranges are maintained.

4. The dispenser of claim 1, wherein the dispenser outlet is positioned below the spray nozzle for providing a pathway for the use solution.

5. A method of dispensing a use solution by impinging a diluent on a solid, the method comprising:

selecting a nozzle and a flow rate of diluent sufficient to dissolve a solid to provide an amount of dissolved solid;

positioning a first dynamic flow control in an incoming diluent passageway, the first dynamic flow control for maintaining a first flow rate independent of the diluent's pressure within a first pressure range;

determining an additional amount of diluent needed to provide a desired concentration of use solution;

positioning a second dynamic flow control in a first supplemental incoming diluent passageway, the second dynamic flow control for maintaining a second flow rate range within a second pressure range;

positioning a third dynamic flow control in a second supplemental incoming diluent passageway;

sensing the diluent's temperature; and activating a bypass valve when diluent's temperature reaches a predetermined temperature and allowing flow through the second incoming diluent passageway.

6. The method of claim 5, wherein the flow controls are constructed from an elastomeric product.

7. The method of claim 6, further comprising the flow controls having a variable orifice that changes in size in response to pressure changes wherein the flow ranges are maintained.

8. The method of claim 5 wherein the flow controls are dynamic flow controls.

9. The method of claim 5, wherein a dispenser outlet is positioned below the spray nozzle for providing a pathway for the use solution.

* * * * *